United States Patent [19]

Ritchie et al.

[11] 4,078,200
[45] Mar. 7, 1978

[54] CURRENT LIMITING CIRCUIT ARRANGEMENTS

[75] Inventors: Grant Edgar Ritchie; John Malcolm Morrison, both of Edinburgh, Scotland

[73] Assignee: Ferranti Limited, Hollinwood, England

[21] Appl. No.: 775,051

[22] Filed: Mar. 7, 1977

[51] Int. Cl.² ............................................. G05F 1/58
[52] U.S. Cl. ...................................... 323/9; 307/237; 323/25; 361/87
[58] Field of Search .......................... 323/1, 9, 23, 25; 361/18, 87, 93, 98; 307/202 R, 237, 92, 93, 100, 202.1

[56] References Cited

U.S. PATENT DOCUMENTS

| 3,769,572 | 10/1973 | Doubt | 323/9 |
| 3,919,601 | 11/1975 | Suko et al. | 323/9 |

Primary Examiner—Gerald Goldberg
Attorney, Agent, or Firm—Cameron, Kerkam, Sutton, Stowell & Stowell

[57] ABSTRACT

Currents greater than predetermined amount are prevented within a circuit arrangement by connecting the electrical supply to at least one conductor via a diode and a transistor, with the diode and the base-collector junction of the transistor in series between the conductor and the supply, and with the emitter connected via a resistor to a point maintained at an appropriate reference potential level, the transistor being in a grounded-base configuration, with the maximum possible collector current defined by the maximum possible emitter current.

11 Claims, 1 Drawing Figure

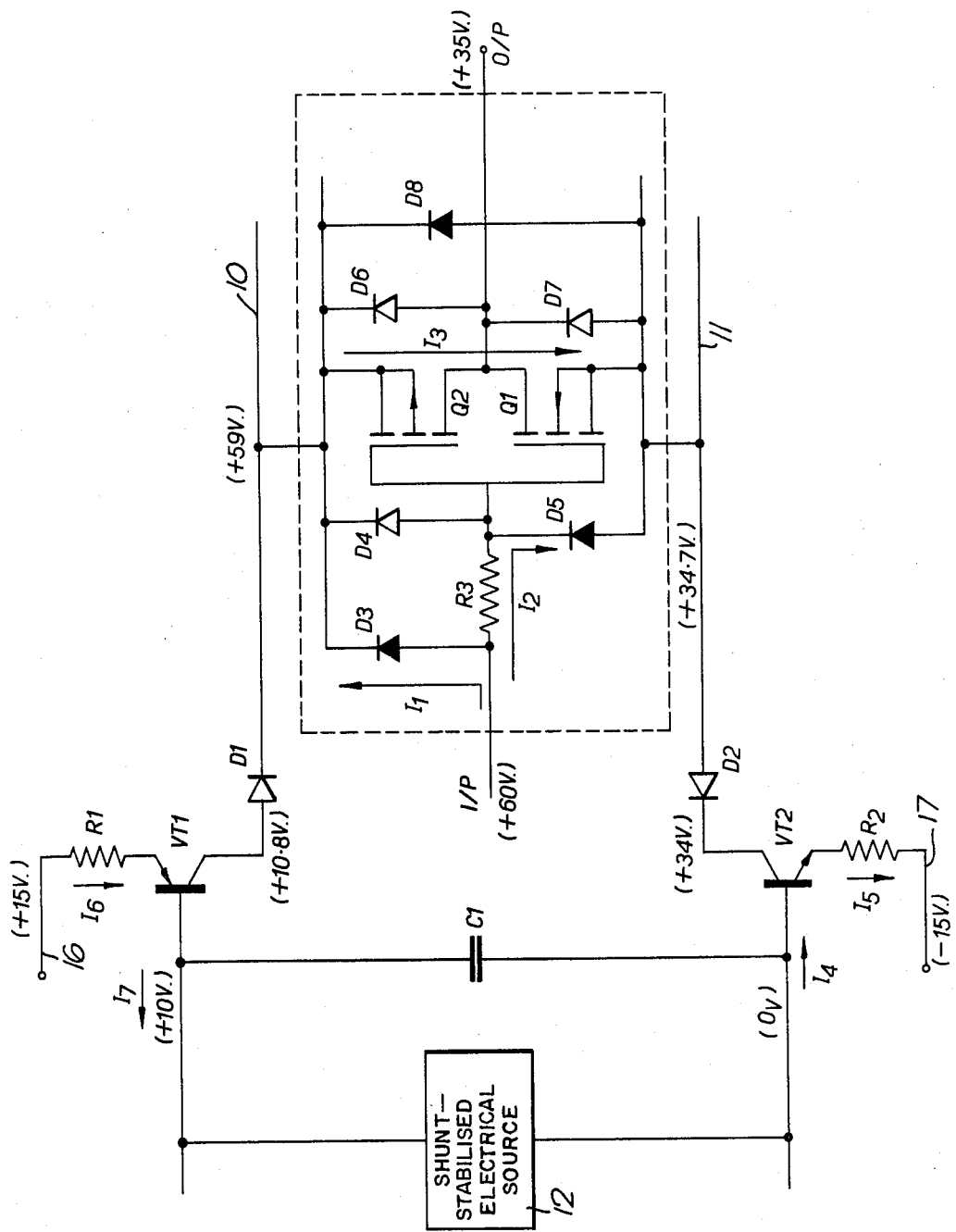

CURRENT LIMITING CIRCUIT ARRANGEMENTS

This invention relates to circuit arrangement, and in particular to circuit arrangements each with at least one device to be at least partially protected from damage by an excessive current therethrough, greater than the desired operating current for the device.

Such an excessive current may be caused by an inadvertent short circuit within the circuit arrangement, or because of a faulty component of the circuit arrangement, or because of an inadvertent short circuit between the circuit arrangement and associated circuitry in a closely-packed assembly, or because of a fault in associated connected circuitry.

It is known, for example, to protect a device from an excessive current flow therethrough by providing current limiting resistors at each terminal of the device. However, this way of protecting each device of a circuit arrangement may be undesirably complex. It is an object of the present invention to provide for such a circuit arrangement a simple and convenient way of at least partially protecting the device within the circuit arrangement from damage due to an excessive current flow through the device; and/or such that the protected circuit arrangement can be embodied in a monolithic semiconductor body; and/or such that monitoring fault conditions in the circuit arrangement is facilitated.

According to the present invention in a circuit arrangement to be connected to an electrical supply and having a supply conductor and a return conductor, respectively, to be maintained at a first and a second reference potential level, and between the conductor there being connected at least one device to be at least partially protected from damage by an excessive current flow therethrough, also has connected to one such conductor current limiting means including a diode and a transistor, with the diode and the base-collector junction of the transistor to be in series between the conductor and the electrical supply for the conductor, and the emitter to be connected via a resistor to a point to be maintained at a third reference potential level, the transistor to be connected in a grounded-base configuration with the maximum possible collector current defined by the maximum possible emitter current, with the maximum possible emitter current in turn defined by the magnitude of the resistor and the difference between the third reference potential level and the potential level of the emitter, the diode being provided to block any possible forward collector-base current, by the diode becoming reverse-biased and the potential level of the associated conductor rising above the required reference value.

The maximum possible collector current is arranged to be above the desired operating current through the device under normally-encountered operating conditions, but less than at least some excessive currents which will damage the device when flowing therethrough.

The current limiting means referred to above has an advantageously simple form, and readily may be provided within a circuit arrangement.

The form of the current limiting means is such that the potential difference across the diode is substantially equal in magnitude, and of opposite sense, to the potential difference across the collector-base junction of the transistor. Hence, the associated conductor of the circuit arrangement, under normally-encountered operating conditions, is substantially at the potential level of the terminal of the electrical supply to which the conductor is connected via the current limiting means.

The current limiting means is to be connected to an associated electrical supply to maintain the point at the third reference potential level.

For a predetermined circuit arrangement, which if in a closely packed assembly is associated with predetermined circuitry, it is possible to envisage the most extreme conditions inadvertently may be applied to the circuit arrangement, or inadvertently may occur within it, and hence it may be possible to design the circuit arrangement to give a required degree of protection for the device of the circuit arrangement from damage because of an excessive current flow therethrough under any such extreme condition. It is advantageous if, according to the present invention, it is only possible partially to protect the device from damage. In any such circuit arrangement there is a maximum possible current flow through the device.

The current limiting means usually, but not inevitably, will be employed in combination with means at least partially to protect the circuit arrangement from damage due to the application thereto of an excessive potential level under any of the conditions it is envisaged inadvertently may be applied to the circuit arrangement.

Further, the circuit arrangement has inherent fail-safe properties, and at least partial protection for the device from damage caused if the transistor of the current limiting means fails, or if any one of the associated electrical supplies providing the reference potential levels fails, or if there is a faulty component in the circuit arrangement, is provided.

These features facilitate the assembling of the circuit arrangement, and provide at least partial protection from inadvertent damage to the constituent components during the assembling of the circuit arrangement.

Usually only one current limiting means, connected to only one conductor of the circuit arrangement, will be provided if an excessive current flow, which will damage the device, is not likely to occur between the other conductors and the device.

If both the supply conductors and the return conductors of the circuit arrangement are connected individually to different current limiting means, the two transistors of the two current limiting means are of opposite conductivity type, the emitter of the transistor of the further current limiting means is to be connected, via a resistor, to a point maintained at a fourth reference potential level of opposite polarity to that of the third reference potential level; and the bases of the two transistors may be connected to the opposing terminals of the associated electrical supply for the circuit arrangement and to be connected to the conductors via the two current limiting means. In relation to the two current limiting means it is not essential that the resistors should have the same magnitude, nor that the differences between the potential levels of the associated conductor and of the emitter are the same, nor that the maximum possible collector currents are the same. Usually, however, the maximum possible collector currents, at least, will be the same.

Whilst current limiting means of the form referred to above may be employed in combination with any type of device required to be at least partially protected from damage by an excessive current flow therethrough, a circuit arrangement including such current limiting means is particularly suitable when the device connected between the conductors comprises a complementary MOS device. Such a device usually is operated with a high impedance load, is energised by a low current supply, is damaged by a current of a similar order of magnitude as the satisfactory energisation current for the device, tends to be damaged by an excessive current which may be produced when the circuit arrangement is switched OFF, and usually the device has a complex construction with many closely-spaced terminals, with a propensity for short circuits to occur between the terminals. Such a device inherently, or otherwise, includes at least one diode, and possibly also a resistor, which serve to provide some protection from damage for the device when excessive voltages are inadvertently applied to the device. However, such protection usually does not prevent damage due to an excessive current which may be encountered, and when flowing through the device. The circuit arrangement of the form according to the present invention is advantageously employed in combination with any such built-in protective means of a complementary MOS device.

A plurality of devices, and possibly more than one type of device, may be provided within the circuit arrangement according to the present invention, each such device to be at least partially protected from damage by an excessive current flow therethrough by the current limiting means. When more than one device is provided within a circuit arrangement, and irrespective of whether the constituent devices are of one type, or not, common current limiting means may be provided for more than one constituent device, and the arrangement may be such that the associated device most likely to be damaged by an excessive current flow therethrough is at least partially protected by the current limiting means. However, even if the maximum possible current flow in such a circuit arrangement is sufficient to energise all the devices, and especially if many devices are provided, usually it will be convenient to divide the circuit arrangement into sections, with each section having at least one device to be at least partially protected from damage by an excessive current flow therethrough. Further, it will be essential to divide the circuit arrangement into sections if at least one constituent device is required to be at least partially protected from a current flow of a magnitude not significantly less than the desired operating current for another constituent device. When the circuit arrangement is so divided into sections each section is provided with at least one conductor and associated current limiting means which are not common with at least one other section. Thus, two different maximum possible currents may be associated with at least two different sections of such a circuit arrangement. Either conductor of a section, and associated current limiting means, if provided, may be common to more than one section of the circuit arrangement. Conveniently, a common electrical supply, at least for the conductor, is provided for the different sections of the circuit arrangement.

According to another aspect the present invention comprises a semiconductor device with a circuit arrangement referred to above embodied in a monolithic semiconductor body. The simplicity of the current limiting means of the circuit arrangement according to the present invention implies that it is particularly adapted to be embodied in the same monolithic semiconductor body as the device to be at least partially protected by the current limiting means.

A circuit arrangement according to the present invention is also advantageous in that it facilitates the monitoring of fault conditions within the circuit arrangement, or within associated circuitry. Thus, according to yet another aspect of the present invention a method of monitoring fault conditions comprises detecting unexpected magnitudes of current, and/or of potential, at predetermined positions within a circuit arrangement referred to above. In particular, a fault condition may be determined by detecting the current flow in a conductors of the circuit arrangement associated with current limiting means, the detection of the presence of the maximum possible current flow in the conductors rail being indicative of the presence of a fault condition within the circuit arrangement.

The present invention will now be described by way of example with reference to the accompanying drawing, which is a circuit diagram of an arrangement comprising one embodiment according to the present invention, and including an inverter comprising part of a conventional complementary MOS (C.MOS) semiconductor device embodied in a monolithic semiconductor body.

The illustrated circuit diagram shows a C.MOS device, including an inverter, connected to a supply conductors 10, and to a return conductors 11, and comprising an N channel insulated-gate field-effect transistor (IGFET) Q1, and a P channel IGFET Q2. The substrates of the complementary IGFET's are connected to the sources, the source of the IGFET Q1 is connected to the return conductors 11, and the source of the IGFET Q2 is connected to the supply conductors 10. The gates of the two complementary IGFET's are connected together, and the drains of the two IGFET's are also connected together. The device includes inherent diode-resistor protection means, comprising diodes D3 to D8, and a resistor R3, to protect the device from excessive potential levels which inadvertently may be applied thereto. For convenience, a reference to one part of the circuit arrangement being connected via a diode to another part of the circuit arrangement will be used to indicate that the diode anode is connected to said one part, and the diode cathode is connected to said other part. Thus, the input 1/P of the inverter is connected to the IGFET gates via the resistor R3, and is connected to the supply conductors 10 via the diode D3. A point intermediate between the resistor R3 and the gates of the IGFET's is connected to the supply conductors 10 via the diode D4, and the return conductors 11 is connected to to this intermediate point via the diode D5. The output O/P of the inverter is connected to the drains of the IGFET's. The drains are also connected to the supply conductors 10 via the diode D6, and the return conductors 11 is connected to the drains via the diode D7. The return conductors 11 is connected to the supply conductors 10 via the diode D8. The supply conductors 10 is to be maintained at a first reference potential level of +10 volts, and the return conductors 11 is to be maintained at second reference potential level of 0 volts, under normal operating conditions for the circuit arrangement.

In the normal operation of the circuit arrangement the 1/P of the illustrated part of the C.MOS device changes between two possible potential levels of +10 volts and 0 volts. In response, the O/P changes, respectively, between two possible potential levels of 0 volts and +10 volts. It is possible for the 1/P and the O/P to be linked to either the supply conductors 10 or to the return conductors 11, respectively, when at the higher or lower of the two possible potential levels.

The C.MOS device is energised by a conventional shunt-stabilised electrical supply 12 connected between the supply conductors 10 and the return rail 11. A smoothing capacitor C1 is connected in parallel with the electrical supply 12.

Although the voltage stabilised electrical supply 12, and the protective arrangement of the diodes D3 to D8 and resistor R3, are provided, it is possible to damage the C.MOS device by an inadvertent, excessive current flow therethrough. A C.MOS device particularly is liable to be so damaged because usually it is operated with a high impedance load, is energised by a low current supply, is damaged by a current of a similar order of magnitude as the satisfactory energisation current for the device, tends to be damaged by an excessive current flow which may be produced when the circuit arrangement is switched OFF, and usually the device has a complex construction with many closely-spaced terminals, with a propensity for short circuits to occur between the terminals.

However, according to the present invention damage to the C.MOS device because of an excessive current flow therethrough is prevented by providing current limiting means between the voltage stabilised electrical supply 12 and each of the supply conductors 10 and the return conductors 11.

The current limiting means between the electrical supply 12, and the supply rail 10 comprises a PNP transistor VT1, the base of which transistor is connected to the electrical supply 12. The emitter of the transistor VT1 is connected via a resistor R1 to a point 16 maintained at a third reference potential level higher than that of the supply rail 10, for example, +15 volts, by electrical supply means (not shown). The collector of the transistor VT1 is connected in a grounded-base configuration with the maximum possible collector current from the supply rail 10 being defined by the maximum possible emitter current, the maximum possible emitter current in turn being defined by the magnitude of the resistor R1 and the difference between the third reference potential level of the point 16 and the potential level of the emitter.

If any current tries to flow in the reverse direction, from the collector to the base of the transistor VT1, the diode D1 becomes reverse-biased, blocking the current. In consequence, the potential level of the supply conductors rises to a value above its normally-encountered operating reference value.

Similar current limiting means, comprising an NPN transistor VT2, resistor R2 and diode D2, is connected between the electrical supply 12 and the return conductors 11. In this case the return conductors 11 is connected via the diode D2 to the collector of the transistor VT2, and the emitter of the transistor VT2 is connected to a point 17 maintained at fourth reference potential level of −15 volts by electrical supply means (not shown). The maximum possible collector current to the return conductors 11 is defined by the maximum possible emitter current, which in turn is defined by the magnitude of the resistor R2 and the difference between the fourth reference potential level of the point 17 and the potential level of the emitter of the transistor VT2.

If any current tries to flow from the base to the collector of the transistor, the diode D2 becomes reverse-biased, blocking the current. In consequence, the potential level of the return conductors rises to a value above its normally-encountered operating reference value.

The maximum possible collector current to the return conductors 11 is defined by the maximum possible emitter current, which in turn is defined by the magnitude of the resistor R2 and the difference between the reference potential level of the point 17 and the potential level of the emitter of the transistor VT2.

The diodes D1 and D2, in addition to preventing the collector-base junctions of the transistors VT1 and VT2 becoming shorted, are advantageous because the potential difference across each diode is substantially equal in magnitude, and of opposite sense, to the potential difference across the collector-base junction of the associated transistor. Hence, the associated conductors 10 or 11, under normally-encountered operating conditions for the circuit arrangement, is substantially at the potential level of the terminal of the electrical supply 12 to which the conductors is connected via the current limiting means.

In one particular embodiment the C.MOS device would be damaged by an excessive current flow greater than 10 milliamperes therethrough. The maximum possible collector current of either transistor VT1 or VT2 is arranged to be this value, and the maximum possible current in the emitter circuit of either transistor VT1 or VT2 is arranged to be approximately 10 milliamperes, and above the desired operating current through the C.MOS device under normally-encountered operating conditions.

One condition under which it is possible to damage the C.MOS device by an excessive current flow therethrough, if the circuit arrangement had not been provided with the current limiting means associated with each conductors 10 and 11, will now be considered as being applied to the circuit arrangement.

If the 1/P of the inverter inadvertently is at a higher positive potential level than the supply conductors 10, for example, at a potential of +60 volts, diode D3 conducts with a current $I_1$ therethrough. The current flow to the transistor VT1 of the current limiting means is negligible, the diode D1 becoming reverse biased, with the supply conductors potential level rising to +59 volts. A maximum possible emitter current $I_6$ flows from the point 16 to the transistor VT1, and a current $I_7$, equal in magnitude to the current $I_6$, flows from the transistor VT1 to the electrical supply 12, this magnitude being equal to 10 milliamperes approximately. The component $I_1$ of the current flowing into the 1/P of the device is equal to the leakage current $I_3$ through the device. The remainder of the current $I_2$ flowing into the 1/P flows through the resistor R3 because the diode D5 goes into avalanche breakdown. This current $I_2$ flows via the return conductors 11 to the point 17, and is limited to 10 milliamperes by the current limiting means associated with the return conductors. The potential level of the return conductors rises to +34.7 volts. The current $I_5$ flowing to the point 17 is equal to $I_2$ plus a small current $I_4$ flowing from the electrical supply 12 to the base of the transistor VT2, the maximum possible emitter current $I_5$ being limited to 10 milliamperes approximately.

Similarly, for other possible extreme conditions which may be applied to the circuit arrangement, a current greater than 10 milliamperes cannot flow through the C.MOS device.

Such possible extreme conditions arise because of an inadvertent short circuit within the circuit arrangement, or because of a faulty component of the circuit arrangement, or because of an inadvertent short circuit between the circuit arrangement and associated circuitry, or because of a fault in associated connected circuitry. With predetermined associated circuitry it is possible to envisage the most extreme conditions which inadvertently may be applied to any point of the circuit arrangement, for example, a voltage of ±60 volts. This, together with a knowledge of the circuit arrangement itself, and of the possible internal faults which may occur, implies that it may be possible to design the circuit arrangement to give complete protection for the C.MOS device from damage because of an excessive current flow therethrough under any such conditions.

It is also advantageous if, according to the present invention, it is only possible partially to protect the device from damage, because of an excessive current flow therethrough, under certain of the extreme conditions it is possible inadvertently may be applied to the circuit arrangement. Hence, it may be possible to design the circuit arrangement to give a required degree of protection for the device. In such a circuit arrangement, also, there is a maximum possible current flow through the device.

It is not essential that the resistors R1 and R2 of the current limiting means should have the same magnitude, nor that the potential differences between the points 16 and 17 and the associated conductors 10 and 11, respectively, have the same magnitude, nor that the maximum possible collector currents of the two current limiting means have the same value. Usually, however, the maximum possible collector currents, at least, will be the same.

Current limiting means may be associated with only one conductors of the circuit arrangement if an excessive current flow which will damage the device is not likely to occur between the other conductors and each device.

The device of the circuit arrangement may not comprise a semiconductor device.

The circuit arrangement according to the present invention, and described above, and having the current limiting means, has only one device. However, a plurality of devices, which may be of more than one type, may be energised by a common stabilised voltage supply means, and may be protected by the described current limiting means being arranged to be common to each such device, especially if each such constituent device is required not to have a current greater than the same value flowing therethrough.

If a large number of devices, which may be of more than one type, are required to be energised from a common stabilised voltage supply means, and/or if different devices are required to be protected from different current magnitudes flowing therethrough, the devices may be separated into sections. Each such section individually has associated with it a supply conductor and/or a return conductor, and may have current limiting means associated with each provided conductor. At least one conductor may be common with a plurality of sections.

When the circuit arrangement has more than one type of device, the device most likely to be damaged is protected from an excessive current flow therethrough. Even if the maximum possible current flow through the device most likely to be damaged is sufficient to energise all the devices, it may be convenient to divide the circuit arrangement into sections as referred to above.

This division of the devices into sections is essential if, alternatively, at least one of the constituent devices is required to be protected from a current flow of a magnitude not significantly less than the desired operating current for another device.

Different maximum possible currents may be associated with the different sections of a circuit arrangement so constructed.

Conveniently, a common electrical supply, at least for the conductors, is provided for the sections.

In any circuit arrangement according to the present invention it may be possible to monitor any fault condition in the circuit arrangement, or in associated circuitry. Thus, for example, merely by detecting a maximum possible current flow in one of the rails associated with current limiting means it may be possible to monitor a fault condition. Further, it may be possible to detect the position of the fault within the circuit arrangement by monitoring the potential level and/or current flow at predetermined positions within the circuit arrangement.

A circuit arrangement according to the present invention has inherent fail-safe properties, and at least partial protection for a device from damage caused if either of the transistors VT1 or VT2 of the current limiting means fail, or if any one of the associated electrical supplies providing the reference potential levels fails, or if there is a faulty component in the circuit arrangement, is provided.

These features facilitate the assembly of the circuit arrangement, and provide at least partial protection from inadvertent damage to the constituent parts of the circuit arrangement during the assembling of the circuit arrangement.

The current limiting means described above has an advantageously simple construction. In particular, conveniently, the circuit arrangement, including the current limiting means, may be embodied in a monolithic semiconductor body.

The electrical supplies to be connected to the circuit arrangement may have any convenient form.

It may not be essential that a circuit arrangement according to the present invention has voltage protection means.

Voltage protection means when provided may not be an inherent feature of the construction of the device.

What we claim is:

1. A circuit arrangement to be connected to an electrical supply and having a supply conductor and a return conductor, respectively, to be maintained at a first and a second reference potential level, and between the conductors there being connected at least one device to be at least partially protected from damage by an excessive current flow therethrough, and also having connected to one such conductors current limiting means including a diode and a transistor, with the diode and the base-collector junction of the transistor to be in series between the conductors and the electrical supply for the conductors, and the emitter to be connected via a resistor to a point to be maintained at a third reference potential level, the transistor to be connected in a grounded-base configuration with the maximum possible collector current defined by the maximum possible emitter current, with the maximum possible emitter current in turn defined by the magnitude of the resistor and the difference between the third reference potential level and the potential level of the emitter, the diode being provided to block any possible forward collector-base current, by the diode becoming reverse-biased and the potential level of the associated conductors rising above the required reference value.

2. A circuit arrangement as claimed in claim 1 in which both the supply conductor and the return conductor are connected individually to different current limiting means, the two transistors of the two current limiting means are of opposite conductivity type, the emitter of the transistor of the further current limiting means is to be connected, via a resistor, to a point maintained at a fourth reference potential level of opposite polarity to that of the third reference potential level.

3. A circuit arrangement as claimed in claim 2 in which the bases of the two transistors of the two current limiting means are to be connected to the opposing terminals of the associated electrical supply for the circuit arrangement and to be connected to the conductors via the two current limiting means.

4. A circuit arrangement as claimed in claim 2 and arranged such that the maximum possible collector currents for each of the two current limiting means are the same.

5. A circuit arrangement as claimed in claim 1 in which the device comprises a complementary MOS device.

6. A circuit arrangement as claimed in claim 1 in which a plurality of devices are provided within the circuit arrangement each to be at least partially protected from damange by an excessive current flow therethrough by the current limiting means.

7. A circuit arrangement as claimed in claim 6 in which more than one type of device is provided within the circuit arrangement each to be at least partially protected from damage by an excessive current flow therethrough by the current limiting means.

8. A circuit arrangement as claimed in claim 6 in which common current limiting means is provided for more than one constituent device.

9. A circuit arrangement as claimed in claim 6 in which the circuit arrangement is divided into sections, with each section having at least one device to be at least partially protected from damage by an excessive current flow therethrough, and each section is provided with at least one conductor and associated current limiting means not common with at least one other section.

10. A circuit arrangement as claimed in claim 9 in which the arrangement is such that two different maximum possible currents associated with at least two different sections.

11. A semiconductor device comprising embodied in a monolithic semiconductor body a circuit arrangement to be connected to an electrical supply and having a supply conductor and a return conductor, respectively, to be maintained at a first and a second reference potential level, and between the conductors there being connected at least one device to be at least partially protected from damage by an excessive current flow therethrough, and also having connected to one such conductors current limiting means including a diode and a transistor, with the diode and the base-collector junction of the transistor to be in series between the conductors and the electrical supply for the conductors, and the emitter to be connected via a resistor to a point to be maintained at a third reference potential level, the transistor to be connected in a grounded-base configuration with the maximum possible collector current defined by the maximum possible emitter current, with the maximum possible emitter current in turn defined by the magnitude of the resistor and the difference between the third reference potential level and the potential level of the emitter, the diode being provided to block any possible forward collector-base current, by the diode becoming reverse-biased and the potential level of the associated conductors rising above the required reference value.

* * * * *